(12) United States Patent
Harvey et al.

(10) Patent No.: US 12,516,781 B2
(45) Date of Patent: Jan. 6, 2026

(54) SYSTEMS AND METHODS FOR DETECTING AND PREVENTING DAMAGE TO PIPES

(71) Applicant: STATE FARM MUTUAL AUTOMOBILE INSURANCE COMPANY, Bloomington, IL (US)

(72) Inventors: Brian N. Harvey, Bloomington, IL (US); Vicki King, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 317 days.

(21) Appl. No.: 18/095,678

(22) Filed: Jan. 11, 2023

(65) Prior Publication Data

US 2024/0142065 A1    May 2, 2024

Related U.S. Application Data

(60) Provisional application No. 63/437,259, filed on Jan. 5, 2023, provisional application No. 63/426,890, filed on Nov. 21, 2022, provisional application No. 63/425,541, filed on Nov. 15, 2022, provisional application No. 63/421,445, filed on Nov. 1, 2022.

(51) Int. Cl.
*F17D 5/06* (2006.01)
*G08B 21/12* (2006.01)

(52) U.S. Cl.
CPC ............... *F17D 5/06* (2013.01); *G08B 21/12* (2013.01)

(58) Field of Classification Search
None
See application file for complete search history.

(56) References Cited

U.S. PATENT DOCUMENTS

| 5,139,044 | A  | * | 8/1992 | Otten ................... A01G 25/16 239/69 |
| 6,105,607 | A  | * | 8/2000 | Caise ................... F16K 31/402 137/487.5 |
| 6,439,260 | B1 | * | 8/2002 | Shuff ........................ F17D 5/06 137/457 |
| 6,696,961 | B2 | * | 2/2004 | Uhler .................... G01F 15/003 340/606 |

(Continued)

OTHER PUBLICATIONS

U.S. Appl. No. 18/095,675, filed Jan. 11, 2023.

*Primary Examiner* — Daniel S Larkin
(74) *Attorney, Agent, or Firm* — MARSHALL, GERSTEIN & BORUN LLP

(57) ABSTRACT

Systems and methods are described for detecting a leak based upon home telematics data. The method may include: (1) receiving home telematics data from one or more sensors associated with one or more pipes (or piping systems) in a structure, wherein the home telematics data is indicative of the frequency with which the one or more pipes are being used; (2) determining, using a trained machine learning algorithm, pipe activity associated with the one or more pipes is occurring at an irregular frequency; (3) determining, based upon at least the determination that the pipe activity associated with the one or more pipes is occurring at the irregular frequency, that the one or more pipes are leaking; and (4) transmitting an indication to a user associated with the home that the one or more pipes are leaking.

17 Claims, 5 Drawing Sheets

(56) References Cited

U.S. PATENT DOCUMENTS

| | | | |
|---|---|---|---|
| 7,299,814 B2* | 11/2007 | Fenton | F17D 5/02 |
| | | | 137/460 |
| 10,546,469 B2* | 1/2020 | Peterson | G01N 27/121 |
| 10,579,075 B2* | 3/2020 | Tahan | F16K 37/0025 |
| 10,685,402 B1* | 6/2020 | Bryant | E03B 7/071 |
| 11,047,761 B1 | 6/2021 | Frackelton et al. | |
| 11,354,748 B1 | 6/2022 | Bryant et al. | |
| 2006/0191323 A1* | 8/2006 | Garabedian | F17D 5/06 |
| | | | 73/40 |
| 2013/0049950 A1* | 2/2013 | Wohlert | H04M 11/04 |
| | | | 340/531 |
| 2014/0238511 A1* | 8/2014 | Klicpera | F16K 31/05 |
| | | | 137/551 |
| 2014/0244997 A1* | 8/2014 | Goel | H04W 12/084 |
| | | | 713/155 |
| 2014/0358592 A1* | 12/2014 | Wedig | G06Q 40/08 |
| | | | 705/4 |
| 2016/0078744 A1* | 3/2016 | Gieck | F25D 29/008 |
| | | | 340/585 |
| 2016/0161940 A1* | 6/2016 | Max | F17D 5/00 |
| | | | 700/282 |
| 2017/0009432 A1* | 1/2017 | Lapointe | F17D 5/06 |
| 2017/0292893 A1 | 10/2017 | Bunker et al. | |
| 2019/0368964 A1 | 12/2019 | Inoue et al. | |
| 2022/0205956 A1 | 6/2022 | Stephens et al. | |
| 2022/0261921 A1 | 8/2022 | Bryant et al. | |
| 2022/0412835 A1 | 12/2022 | Sewell et al. | |
| 2023/0334646 A1 | 10/2023 | Ziola | |

* cited by examiner

SYSTEMS AND METHODS FOR DETECTING AND PREVENTING DAMAGE TO PIPES

CROSS-REFERENCE TO RELATED APPLICATIONS

This application claims priority to and the benefit of the filing date of provisional U.S. Patent Application No. 63/421,445 entitled "Systems and Methods for Detecting and Preventing Damage to Pipes," filed on Nov. 1, 2022, provisional U.S. Patent Application No. 63/425,541 entitled "Systems and Methods for Detecting and Preventing Damage to Pipes," filed on Nov. 15, 2022, provisional U.S. Patent Application No. 63/426,890 entitled "Systems and Methods for Detecting and Preventing Damage to Pipes," filed on Nov. 21, 2022, and provisional U.S. Patent Application No. 63/437,259 entitled "Systems and Methods for Detecting and Preventing Damage to Pipes," filed on Jan. 5, 2023. The entire contents of the provisional applications are hereby expressly incorporated herein by reference.

FIELD OF THE DISCLOSURE

Systems and methods are disclosed for using home telematics data and determining a potential for damage to pipes based upon at least the home telematics data.

BACKGROUND

Homeowners may often be unable or unwilling to check pipes with the frequency needed to ensure a leak is detected. In particular, areas in a building that an owner does not frequent often may lead to a leak going undetected for long periods of time, leading to extensive damages. Similarly, a building that an owner is not at frequently (e.g., a secondary home) or is currently away from (e.g., on a vacation) may spring a leak that goes unnoticed. Similarly, when a building is not winterized properly and is not frequently used, a pipe may freeze and burst without an owner's notice. Conventional techniques may include additional ineffectiveness, inefficiencies, encumbrances, and/or other drawbacks.

SUMMARY

The present embodiments may relate to, inter alia, accurately and efficiently determining when a pipe or piping system has burst and/or sprung a leak. Systems and methods that may detect or determine when a pipe or piping system is likely to burst and/or spring a leak are also provided.

In one aspect, a computer-implemented method detecting a potential burst pipe based upon home telematics data may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, and/or other electronic or electrical components. In one instance, the method may include (1) receiving, by one or more processors, home telematics data associated with a structure, wherein the home telematics data includes a weather forecast for an area associated with the structure; (2) determining, by the one or more processors and based upon at least the home telematics data, that a temperature associated with the structure will reach a temperature threshold; (3) determining, by the one or more processors and based upon at least the home telematics data and the temperature associated with the structure, that a threshold likelihood of bursting is exceeded for one or more pipes (or piping systems); and/or (4) transmitting, by the one or more processors, an indication to a user associated with the structure that the one or more pipes (or piping systems) are likely to burst. The method may include additional, less, or alternate actions and functionality, including that discussed elsewhere herein.

For instance, the method may further include: causing one or more smart devices in the structure to increase the temperature associated with the structure. The method may further include: determining a temperature modification value by which to increase the temperature associated with the structure based upon at least one of: (i) a location of each of the one or more pipes (or piping systems), (ii) a size of the structure, (iii) a likely drop in temperature for the area associated with the structure, or (iv) a location of the one or more smart devices.

The method may further include causing a water flow through the one or more pipes (or piping systems) to stop responsive to the determining that the threshold likelihood of bursting is exceeded for the one or more pipes.

The method may further include: determining that pipe activity associated with the one or more pipes (or piping systems) is occurring at an irregular frequency; wherein the determining that the threshold likelihood of bursting is exceeded for the one or more pipes (or piping systems) is further based upon the pipe activity.

The method may further include: detecting, based upon the home telematics data, that the user is not present at the structure; wherein the determining that the temperature associated with the structure will reach the temperature threshold is responsive to the detecting. Additionally or alternatively, the indication that the one or more pipes (or piping systems) are likely to burst may include one or more recommended actions for the user to mitigate damage.

In another aspect, a computing device configured for detecting a leak based upon home telematics data may be provided. The computing device may include one or more processors; a communication unit; and a non-transitory computer-readable medium coupled to the one or more processors and the communication unit and storing instructions thereon that, when executed by the one or more processors, cause the computing device to: (1) receive home telematics data associated with a structure, wherein the home telematics data includes a weather forecast for an area associated with the structure; (2) determine, based upon at least the home telematics data, that a temperature associated with the structure will reach a temperature threshold; (3) determine, based upon at least the home telematics data and the temperature associated with the structure, that a threshold likelihood of bursting is exceeded for one or more pipes (or piping systems); and/or (4) transmit an indication to a user associated with the structure that the one or more pipes (or piping systems) are likely to burst. The computing device may include additional, less, or alternate functionality, including that discussed elsewhere herein.

In another aspect, a tangible, non-transitory computer-readable medium storing instructions for detecting a leak based upon home telematics data may be provided. The non-transitory computer-readable medium stores instructions that, when executed by one or more processors of a computing device, cause the computing device to: (1) receive home telematics data associated with a structure, wherein the home telematics data includes a weather forecast for an area associated with the structure; (2) determine, based upon at least the home telematics data, that a temperature associated with the structure will reach a temperature threshold; (3) determine, based upon at least the home telematics data and the temperature associated with the structure, that a threshold likelihood of bursting is exceeded for one or more pipes (or piping systems); and/or (4) transmit an indication to a user associated with the structure that the one or more pipes (or piping systems) are likely to burst. The computer-readable instructions may include instructions that provide additional, less, or alternate functionality, including that discussed elsewhere herein.

In one aspect, a computer-implemented method of mitigating or preventing water damage to a home (or other building) may be provided. The method may be implemented via one or more local or remote processors, servers, sensors, transceivers, memory units, mobile devices, wearables, smart glasses, augmented reality glasses, virtual reality glasses, mixed or extended reality glasses or headsets, smart contacts, and/or other electronic or electrical components. In one instance, the method may include (1) generating, via one or more sensors, home-related data; (2) collecting or receiving, via one or more local or remote processors and/or associated transceivers, the home-related data; (3) analyzing, via the one or more local or remote processors, the home-related data to detect or determine that the home is unoccupied; (4) acquiring or monitoring, via the one or more local or remote processors, weather and/or forecast data for the home's location; (5) determining, via the one or more local or remote processors, if a temperature outside of the home (i.e., at the home's location) and/or if a temperature inside of the home is equal to less than a threshold temperature (e.g., 32 degrees, 30 degrees, 25 degrees, between 25-32 degrees, less than 32 degrees, etc.); and/or (6) if (i) the home is determined to be unoccupied, and (ii) the outside temperature at the home's location or the temperature inside the home is below a temperature threshold, then initiating, via the one or more local or remote processors and/or associated transceivers, one or more corrective actions (such as mitigating or preventive actions). The method may include additional, less, or alternate actions and functionality, including that discussed elsewhere herein.

For instance, the one or more sensors may be home-mounted sensors (including cameras, video recorders, and/or audio recorders), motion sensors, water sensors, flow sensors, mobile device sensors, vehicle sensors, water meters, electricity sensors or meters; and/or home security systems. Analyzing, via the one or more local or remote processors, the home-related data to detect or determine that the home is unoccupied may include determining that the home is currently unoccupied and/or has been unoccupied for over a given period of time (such as the home has been unoccupied for 24 hours, a number of days, a week, etc.).

The one or more corrective actions may include (i) generating, via the one or more local or remote processors, an electronic alert or other electronic message indicating the temperature outside of the home or inside the home, and that the home is unoccupied; and/or (2) transmitting, via the one or more local or remote processors and/or associated transceivers, the alert to the mobile device of the home owner, a resident of the home, or a trusted neighbor.

The one or more corrective actions may include (i) generating, via the one or more local or remote processors, an electronic alert or other electronic message indicating that the home is unoccupied and/or a temperature outside or inside of the home; and/or (2) transmitting, via the one or more local or remote processors and/or associated transceivers, the alert to the mobile device of the home owner, a resident of the home, or a trusted neighbor.

The one or more corrective actions may include (1) generating, via the one or more local or remote processors, an electronic alert or other message indicating that the home is unoccupied and/or a temperature outside or inside of the home, and requesting permission to remotely adjust the temperature within the home and/or remotely adjust a smart thermostat within the home; (2) transmitting, via the one or more local or remote processors and/or associated transceivers, the alert to the mobile device of the home owner, a resident of the home, or a trusted neighbor; and/or (3) receiving, via the one or more local or remote processors and/or associated transceivers, a signal or command from the mobile device to remotely adjustor raise the temperature within home or otherwise adjust a smart thermostat.

The one or more corrective actions may include automatically adjusting or raising, via the one or more local or remote processors and/or transceivers, the temperature within the home (such as raising the temperature above a predetermined temperature, such as 40 degrees, 35 degrees, 32 degrees, etc.). Additionally or alternatively, the one or more corrective actions may include automatically adjusting or raising, via the one or more local or remote processors and/or transceivers, a smart thermostat of the home.

Analyzing, via the one or more local or remote processors, the home-related data to detect or determine that the home is unoccupied may include determining that the home is currently unoccupied by using electronic calendar data, such as electronic calendar data residing on an insured's or home owner's mobile device. Additionally or alternatively, analyzing, via the one or more local or remote processors, the home-related data to detect or determine that the home is unoccupied may include determining that the home is currently unoccupied by using GPS data acquired from a mobile device and/or a smart vehicle. Additionally or alternatively, analyzing, via the one or more local or remote processors, the home-related data to detect or determine that the home is unoccupied may include determining that the home is currently unoccupied by using GPS data acquired from a mobile device and/or a smart vehicle, and/or the GPS data indicating the home owner is over a threshold distance from the home (such as over 100 miles, 200 miles, 500 miles, etc.).

In another aspect, a computer system configured for mitigating or preventing water damage to a home (or other building) may be provided. The computer system may include one or more local or remote processors, servers, sensors, transceivers, memory units, mobile devices, wearables, smart glasses, augmented reality glasses, virtual reality glasses, mixed or extended reality glasses or headsets, smart contacts, and/or other electronic or electrical components, which may in wired or wireless communication with one another. In one instance, the system may include one or more home-mounted or other sensors; and one or more local or remote processors and/or associated transceivers in wired or wireless communication with the sensors over one or more radio frequency links. The one or more sensors may be configured to generate home-related data; and the one or more local or remote processors and/or associated transceivers configured to: (1) collect or receive the home-related data, such as via wired or wireless communication, for the one or more sensors; (2) analyze the home-related data to detect or determine that the home is unoccupied; (3) acquire or monitor weather and/or forecast data for the home's location; (4) determine if a temperature outside of the home (i.e., at the home's location or in the vicinity or proximity of the home) and/or if a temperature inside of the home is equal to less than a threshold temperature (e.g., 32 degrees, 30 degrees, 25 degrees, between 25-32 degrees, less than 32 degrees, etc.); and/or (5) if (i) the home is determined to be unoccupied, and (ii) the outside temperature at the home's location or the temperature inside the home is below a temperature threshold, then initiate one or more corrective actions (such as mitigating or preventive actions). The system may include additional, less, or alternate functionality, including that discussed elsewhere herein.

For instance, the one or more sensors may be home-mounted sensors (including cameras, video recorders, and/or audio recorders), motion sensors, water sensors, flow sensors, mobile device sensors, vehicle sensors, water meters, electricity sensors or meters; and/or home security systems. Analyzing, via the one or more local or remote processors, the home-related data to detect or determine that the home is unoccupied may include the one or more local or remote processors determining that the home is currently unoccupied and has been unoccupied for over a given period of time (such as the home has been unoccupied for 24 hours, a number of days, a week, etc.).

The one or more corrective actions may include the one or more local or remote processors and/or associated transceivers: (i) generating an electronic alert indicating the temperature outside of the home or inside the home, and that the home is unoccupied; and/or (ii) transmitting the alert to the mobile device of the home owner, a resident of the home, or a trusted neighbor. Additionally or alternatively, the one or more corrective actions may include the one or more local or remote processors and/or associated transceivers: (1) generating an electronic alert indicating that the home is unoccupied and/or a temperature outside or inside of the home; and/or (2) transmitting the alert to the mobile device of the home owner, a resident of the home, or a trusted neighbor.

Additionally or alternatively, the one or more corrective actions may include the one or more local or remote processors and/or associated transceivers: (1) generating an electronic alert indicating that the home is unoccupied and/or a temperature outside or inside of the home, and requesting permission to remotely adjust the temperature within the home and/or remotely adjust a smart thermostat within the home; (2) transmitting the alert to the mobile device of the home owner, a resident of the home, or a trusted neighbor; and/or (3) receiving a signal or command from the mobile device to remotely adjustor raise the temperature within home or otherwise adjust a smart thermostat.

Additionally or alternatively, the one or more corrective actions may include the one or more local or remote processors and/or associated transceivers automatically adjusting or raising the temperature within the home (such as raising the temperature above a predetermined temperature, such as 40 degrees, 35 degrees, 32 degrees, etc.). Additionally or alternatively, the one or more corrective actions may include the one or more local or remote processors and/or associated transceivers automatically adjusting or raising a smart thermostat of the home.

Analyzing, via the one or more local or remote processors, the home-related data to detect or determine that the home is unoccupied may include the one or more local or remote processors and/or associated transceivers determining that the home is currently unoccupied by using electronic calendar data. Additionally or alternatively, analyzing, via the one or more local or remote processors, the home-related data to detect or determine that the home is unoccupied may include the one or more local or remote processors and/or associated transceivers determining that the home is currently unoccupied by using GPS data acquired from a mobile device and/or a smart vehicle. Additionally or alternatively, analyzing, via the one or more local or remote processors, the home-related data to detect or determine that the home is unoccupied may include the one or more local or remote processors and/or associated transceivers determining that the home is currently unoccupied by using GPS data acquired from a mobile device and/or a smart vehicle, and/or the GPS data indicating the home owner is over a threshold distance from the home (such as over 50 miles, 100 miles, 200 miles, 300 miles, 500 miles, etc.).

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
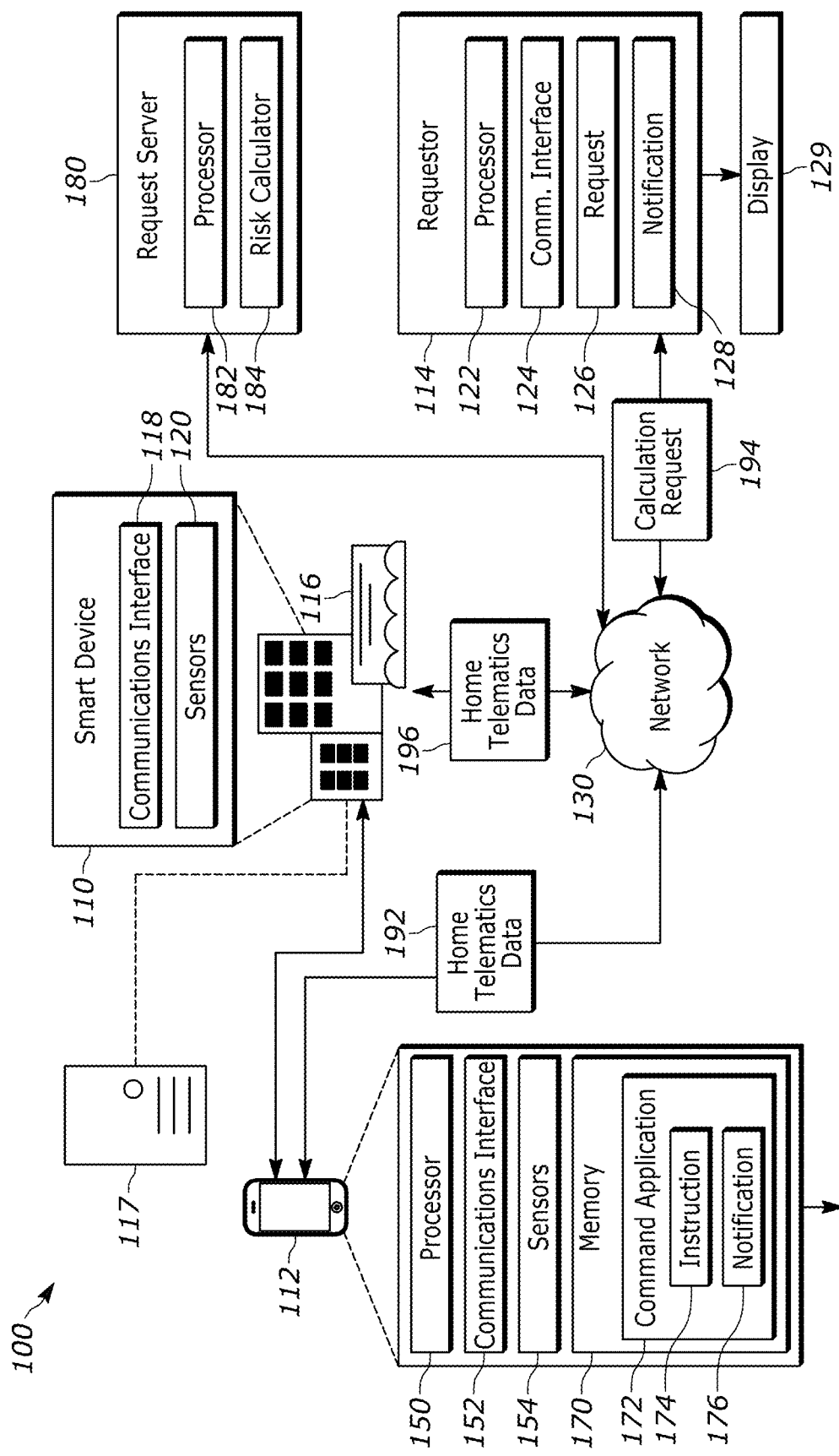
FIG. 1 depicts an exemplary computer system that facilitates generating and recording home telematics data for calculating a level of risk of leakage or bursting.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for detecting a leak and/or damaged pipe (and/or piping systems) based upon home telematics data. For example, a system may receive home telematics data regarding a home, building, environment, etc. The system may receive weather data for a property, occupancy data for the property, historical damage data, etc.

In some scenarios, a user can place capacitive sensors under a floor, roof, etc. to detect when leaking occurs in pipes. Similarly, accelerometers, imaging sensors, audio sensors, and/or infrared sensors may allow a system to automatically make a determination that a leak is occurring according to a machine learning analysis. A system may make such a determination based upon pattern matching from vibrations in pipes (or piping systems), audio patterns, or detection of visual indicators, such as dripping water. When a pipe is in an enclosed space, a humidity sensor may similarly be used to determine that water is escaping a pipe. The sensors may then transmit an alert to an application on a user device, indicating a general area of where the leak has occurred and/or the severity of the leak.

In further scenarios, a specialized tape including sensors and/or wires may be used along accessible portions of pipe (or piping system) so a system may determine when a leak occurs using machine learning techniques. In particular, the system may determine, via the tape, how often a particular appliance or pipe is used and may make a determination as to whether an unusual level of activity is occurring based upon such. For example, a secondary bathroom or system in a vacation home may not see much usage, so if a sink begins running for too long or too frequently, the system may determine that the pipe is leaking. The system may generate a model during an initial calibration phase before using the model to make such determinations. When the system determines that an unusual level of activity is occurring, it may alert the user through a mobile application, text message, etc. and/or may offer a recommendation for a response.

In other scenarios with lesser used properties, such as for secondary or vacation homes, pipes may become frozen and burst when a user fails to properly winterize the location. As such, a system to determine when a leak is detected or when a pipe (and/or piping system) has burst may allow the user to respond and prevent damage. In a smart home or a home with smart systems, the system may additionally or alternatively shut off a water valve remotely upon detecting a leak or a lack of/excess water through an area for a period of time. The system may use additional smart home sensors such as motion sensors, electricity usage sensors, etc. in making the determination.

Similarly, a system may additionally use a connection to weather to determine if weather will likely cause a home to drop below a certain temperature, putting pipes (or piping systems) at risk of bursting. The system may similarly determine whether the user is present using smart home sensors and/or indications from the user. When the user is determined to not be present and the weather forecast is likely to cause burst pipes (or piping systems), the system may then send recommendations to the user to increase temperatures in the house. Alternatively, the system may automatically modify the temperature to prevent damage. The system may additionally determine how far to adjust the temperature based upon the location of pipes (or piping systems), the size of the house, the likely drop in temperature, etc.

As such, a system implementing the techniques as described herein offers improvements over standard computing systems. For example, by using algorithms/models trained via machine learning to determine when a pipe is leaking, frozen, etc., the system may be able to take action and cause smart devices or systems to activate, preventing damage to a user's property. Further, by training such models using: sensor data from sensors such as those described herein, weather and/or forecast data, or occupancy data as described herein, the system is able to track regular activity and determine when irregularities occur.

Moreover, by interfacing with smart devices, applications, and/or internal property systems (e.g., heating, water, etc.), the system is able to take action in response to determining when such irregularities occur. For example, a system may be able to adjust a temperature of a property, block or redirect water flow for the property, alert a user of potential damage and/or instructions, etc. Further, other improvements are offered by the instant techniques as described in more detail below.

Exemplary Computer System for Mitigating or Preventing Water Damage to a Structure FIG. 1 depicts an exemplary computer system 100 for mitigating or preventing water damage to a home (or other building), in accordance with various aspects of the present disclosure. An entity (e.g., requestor 114), such as a user or an insurance company, may wish to calculate a level of risk for a user regarding a real property (e.g., property 116).

Additionally, the property (e.g., property 116) and, more specifically, a computing device 117 associated with the property 116, a smart device 110 within the property 116, and/or one or more mobile devices may detect, gather, or store home data (e.g., home telematics data) associated with the functioning, operation, and/or evaluation of the property 116. The computing device 117 associated with the property 116 may transmit home telematics data in a communication 196 via the network 130 to a request server 180. In some embodiments, the request server 180 may already store home data (e.g., home telematics data) and/or user data (e.g., user telematics data) in addition to any received home telematics data or user telematics data. Further, the request server 180 may use the home telematics data and/or user telematics data to determine characteristics of a property (e.g., temperature, weather, occupancy, etc.) and/or structures on a property (e.g., pipes, smart devices, water systems, etc.). Additionally or alternatively, one or more mobile devices (e.g., mobile device 112) communicatively coupled to the computing device associated with the property 116 may transmit home telematics data and/or user telematics data in communication 192 to the request server 180 via the network 130.

The smart device 110 may include a processor, a set of one or several sensors 120, and/or a communications interface 118. In some embodiments, the smart device 110 may include single devices, such as a smart heater, smart thermostat, smart doorbell, or any other similar smart device. In further embodiments, the smart device 110 may include a network of devices, such as a security system, a lighting system, a heating system, a plumbing system or any other similar series of devices communicating with one another. The set of sensors 120 may include, for example, a camera or series of cameras, a motion detector, a temperature sensor, an airflow sensor, a smoke detector, a carbon monoxide detector, or any similar sensor.

Although FIG. 1 depicts the set of sensors 120 inside the smart device 110, it is noted that the sensors 120 need not be internal components of the smart device 110. Rather, a property 116 may include any number of sensors in various locations, and the smart device 110 may receive data from these sensors during operation. Depending on the embodiment, the sensors may include one or more sensors embedded in tape connected to one or more pipes. Similarly, the sensors 120 may include one or more sensors disposed to determine a temperature of the building, a water flow of the building, weather surrounding a property 116, etc. In further embodiments, the computing device 117 associated with the property 116 may receive data from the sensors during operation. In still further embodiments, the computing device 117 associated with the property 116 may be the smart device 110.

The communications interface 118 may allow the smart device 110 to communicate with the mobile device 112, the sensors 120, and/or a computing device 117 associated with the property 116. The communications interface 118 may support wired or wireless communications, such as USB, Bluetooth, Wi-Fi Direct, Near Field Communication (NFC), etc. The communications interface 118 may allow the smart device 110 to communicate with various content providers, servers, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the smart device 110 and the mobile device 112, sensors 120, and/or computing device 117 associated with the property 116; process data from the sensors 120; transmit communications to the request server 180, etc.

In some embodiments, the smart device 110 may collect the home telematics data using the sensors 120. Depending on the embodiment, the smart device may collect home telematics data regarding the usage and/or occupancy of the property. In some embodiments, the home telematics data may include data, such as security camera data, electrical system data, plumbing data, appliance data, energy data, maintenance data, guest data, and any other suitable data representative of property 116.

For instance, the home telematics data may include data gathered from motion sensors and/or images of the home from which it may be determined how many people occupy the property and the amount of time they each spend within the home. Additionally or alternatively, the home telematics data may include electricity usage data, water usage data, HVAC usage data (e.g., how often the furnace or air conditioner unit is on), and smart appliance data (e.g., how often the stove, oven, dish washer, or clothes washer is operated). The home telematics data may also include home occupant mobile device data or home guest mobile device data, such as GPS or other location data.

The user data (e.g., user telematics data) may include data from the user's mobile device, or other computing devices, such as smart glasses, wearables, smart watches, laptops, smart glasses, augmented reality glasses, virtual reality headsets, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected occupancy data, projected claim data, projected accident data, etc. Depending on the embodiment, the historical user data and the present and/or future data may be related.

The user data or user telematics data may also include vehicle telematics data collected or otherwise generated by a vehicle telematics app installed and/or running on the user's mobile device or other computing device. For instance, the vehicle telematics data may include data representative of a user's location, travel habits, tendency to spend time at the property 116, etc.

The user data or user telematics data may also include home telematics data collected or otherwise generated by a home telematics app installed and/or running on the user's mobile device or other computing device. For instance, a home telematics app may be in communication with a smart home controller and/or smart appliances or other smart devices situated about a home, and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data.

Mobile device 112 may be associated with (e.g., in the possession of, configured to provide secure access to, etc.) a particular user, who may be an owner of a property or a guest staying at the property, such as property 116. Mobile device 112 may be a personal computing device of that user, such as a mobile device, smartphone, a tablet, smart contacts, smart glasses, smart headset (e.g., augmented reality, virtual reality, or extended reality headset or glasses), smart watch, wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including command application 172.

The mobile device 112 may be communicatively coupled to the smart device 110, the sensors 120, and/or a computing device 117 associated with the property 116. For example, the mobile device 112 and the smart device 110, sensors 120, and/or computing device 117 associated with the property 116 may communicate via USB, Bluetooth, Wi-Fi Direct, Near Field Communication (NFC), etc. For example, the smart device 110 may send home telematics data, user telematics data, or other sensor data in the property 116 via communications interface 118 and the mobile device 112 may receive the home telematics data or other sensor data via communications interface 152. In other embodiments, mobile device 112 may obtain the home telematics data from the property 116 from sensors 154 within the mobile device 112.

Further still, mobile device 112 may obtain the home telematics data and/or user telematics data via a user interaction with a display 160 of the mobile device 112. For example, a user may indicate via the display 160 that the user is not present in a building and/or confirm or give instructions via the display 160. The mobile device 112 may then generate a communication that may include the home telematics data and/or user telematics data, and may transmit the communication 192 to the request server 180 via communications interface 152.

In some embodiments, the command application 172 may include or may be communicatively coupled to a leaking and/or burst pipe detection application or website as well as one or more smart devices 110. In such embodiments, the request server 180 may obtain the home telematics data and/or user telematics data via stored data in the command application, via instructions 174 from the user, or via a notification 176 in the command application 172.

Depending on the embodiment, a computing device 117 associated with the property 116 may obtain home telematics data for the property 116 indicative of environmental conditions, housing and/or construction conditions, location conditions, or other similar metrics of home telematics data. The computing device 117 associated with the property 116 may obtain the home telematics data from one or more sensors 120 within the property 116. In other embodiments, the computing device 117 associated with the property 116 may obtain home telematics data through interfacing with a mobile device 112.

In some embodiments, the home telematics data may include interpretations of raw sensor data, such as detecting a homeowner is present when a sensor detects motion during a particular time period. The computing device 117 associated with the property 116, mobile device 112, and/or smart device 110 may collect and transmit home telematics data to the request server 180 via the network 130 in real-time or at least near real-time at each time interval in which the system 100 collects home telematics data. In other embodiments, a component of the system 100 may collect a set of home telematics data at several time intervals over a time period (e.g., a day), and the smart device 110, computing device 117 associated with the property 116, and/or mobile device 112 may generate and transmit a communication which may include the set of home telematics data collected over the time period.

Also, in some embodiments, the smart device 110, computing device 117 associated with the property 116, and/or mobile device 112 may generate and transmit communications periodically (e.g., every minute, every hour, every day), where each communication may include a different set of home telematics data and/or user telematics data collected over the most recent time period. In other embodiments, the smart device 110, computing device 117 associated with the property 116, and/or mobile device 112 may generate and transmit communications as the smart device 110, mobile device 112, and/or computing device 117 associated with the property 116 receive new home telematics data and/or user telematics data.

In further embodiments, a trusted party may collect and transmit the home telematics data and/or user telematics data, such as an evidence oracle. The evidence oracles may be devices connected to the internet that record and/or receive information about the physical environment around them, such as a smart device 110, a mobile device 112, sensors 120, a request server 180, etc. In further examples, the evidence oracles may be devices connected to sensors such as connected video cameras, motion sensors, environmental conditions sensors (e.g., measuring atmospheric pressure, humidity, etc.), as well as other Internet of Things (IoT) devices.

The data may be packaged into a communication, such as communication 192 or 196. The data from the evidence oracle may include a communication ID, an originator (identified by a cryptographic proof-of-identity, and/or a unique oracle ID), an evidence type, such as video and audio evidence, and/or encrypted evidence. In another embodiment, the evidence is not encrypted, but may be directly accessible by an observer or other network participant.

Next, the smart device 110 and/or computing device 117 associated with the property 116 may generate a communication 196 including a representation of the home telematics data wherein the communication 196 is stored at the request server 180 and/or an external database (not shown).

In some embodiments, generating the communication 196 may include (i) obtaining identity data for the smart device 110, computing device 117, and/or the property 116; (ii) obtaining identity data for the mobile device 112 in the property 116; and/or (iii) augmenting the communication 196 with the identity data for the smart device 110, the property 116, the computing device 117, and/or the mobile device 112. The communication 196 may include the home telematics data.

In some embodiments, the mobile device 112 or the smart device 110 may transmit the home telematics data and/or user telematics data to a request server 180. The request server 180 may include a processor 182 and a memory that stores various applications for execution by the processor 182. For example, a risk calculator 184 may obtain home telematics data for a property 116 and/or user telematics data for a user to analyze and calculate a risk (e.g., of leakage, bursting, damage, etc.) during a particular time period in response to a calculation request 194, as described in more detail below with regard to FIGS. 2-4.

In further embodiments, a requestor 114 may transmit a communication including a risk calculation request 194 to the request server 180 via the network 130. Depending on the embodiment, the requestor may include one or more processors 122, a communications interface 124, a request module 126, a notification module 128, and a display 129. In some embodiments, each of the one or more processors 122, communications interface 124, request module 126, notification module 128, and display 129 may be similar to the components described above with regard to the mobile device 112.

Depending on the embodiment, the requestor 114 may be associated with a particular user, such as a homeowner, a tenant, a homeshare participant, a home rental website and/or application, a real estate company, an underwriting company, an insurance company, etc. In some embodiments, the requestor 114 may be associated with the same user as the request server 180. In other embodiments, the requestor 114 is associated with a different user than the request server 180. In some such embodiments, the request module 126 and/or notification module 128 may include or be part of a request application, such as an underwriting application, an insurance application, etc.

In some embodiments, the requestor 114 may transmit a communication including a calculation request 194 to the request server 180 via the communications interface 124. In some such embodiments, the requestor 114 may request the risk to use as an input to a rating model, an underwriting model, a claims generation model, or any other similarly suitable model. For example, the requestor 114 may request the risk of leakage to use to determine an overall potential risk for a property. As another example, the requestor 114 may request multiple risks (e.g., leakage, bursting, etc.) to determine potential hazards with regard to building types.

In some embodiments, the calculated risk may be representative of a level of risk related to the property. The level of risk calculation may include a determination as to past or potential claim damage and/or severity of claim damage. In some embodiments, the level of risk may refer to a level of risk for a particular time period. Additionally or alternatively, the level of risk may include a determination of a quote or cost associated with the level of risk for the particular time period. In still further embodiments, the level of risk may include a determination of a quote or cost associated with the level of risk for a longer period of time, such as a month, year, etc.

In some embodiments, a mobile device 112 may stream the home telematics data and/or user telematics data to the request server 180 via the network 130 in real or near-real time. For example, the mobile device and/or a command application 172 on the mobile device 112 may update the request server 180 via the network 130 whenever a new event occurs with regard to home telematics data and/or user telematics data. In further embodiments, the mobile device 112 may receive confirmations of updated information and may notify the user that the mobile device 112 has updated the request server 180 via the network 130.

The mobile device 112 and the computing device 117 associated with the property 116 may be associated with the same user. Mobile device 112, and optionally the computing device 117 associated with the property 116, may be communicatively coupled to requestor 114 via a network 130. Network 130 may be a single communication network, or may include multiple communication networks of one or more types (e.g., one or more wired and/or wireless local area networks (LANs), and/or one or more wired and/or wireless wide area networks (WANs) such as the internet). In some embodiments, the requestor 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG. 1 shows only one property 116 and associated computing device 117, it is understood that many different entity locations, each similar to property 116, may include computing devices 117 that are in remote communication with network 130. Further, while FIG. 1 shows only one requestor, 114, it is understood that many different requestors, each similar to requestor 114, may be in remote communication with network 130. Requestor 114 and/or any other similar requestor may be associated with an insurance company, a regulator organization, a property rental company, and/or a similar organization.

Exemplary Machine Learning

Optionally, the system 100 may determine particular data, whether a pipe is leaking, and/or a level of risk of damage from the home telematics data and/or user telematics data using a machine learning model for data evaluation. The machine learning model may be trained based upon a plurality of sets of home telematics data and/or user telematics data, and corresponding determinations. The machine learning model may use the home telematics data and/or user telematics data to generate the determinations as described herein.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

Some embodiments described herein may include automated machine learning to determine risk levels, identify relevant risk factors, evaluate home telematics data and/or user telematics data, identify environmental risk factors, identify locale-based risk factors, identify plumbing risk factors, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with smart device-mounted, home-mounted, and/or mobile device-mounted sensor data to identify certain home data, such as analyzing home telematics data and/or user telematics data to identify and/or determine environmental data, location data, first responder data, home structure data, occupancy data, usage data, a likelihood of pipe damage, and/or other such potentially relevant data. In some embodiments, the machine learning programs may be trained with irregularities such that the machine learning programs may be trained to match, compare, and/or otherwise identify pipe events, such as leaking or bursting. Depending on the embodiment, the machine learning programs may be initially trained according to such using example training data and/or may be trained while in operation using incident data for a particular property.

After training, machine learning programs (or information generated by such machine learning programs) may be used to evaluate additional data. Such data may be related to publicly accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

It will be understood that the above disclosure is one example and does not necessarily describe every possible embodiment. As such, it will be further understood that alternate embodiments may include fewer, alternate, and/or additional steps or elements.

Exemplary Leak and/or Damage Detection Operations

Figure 2:
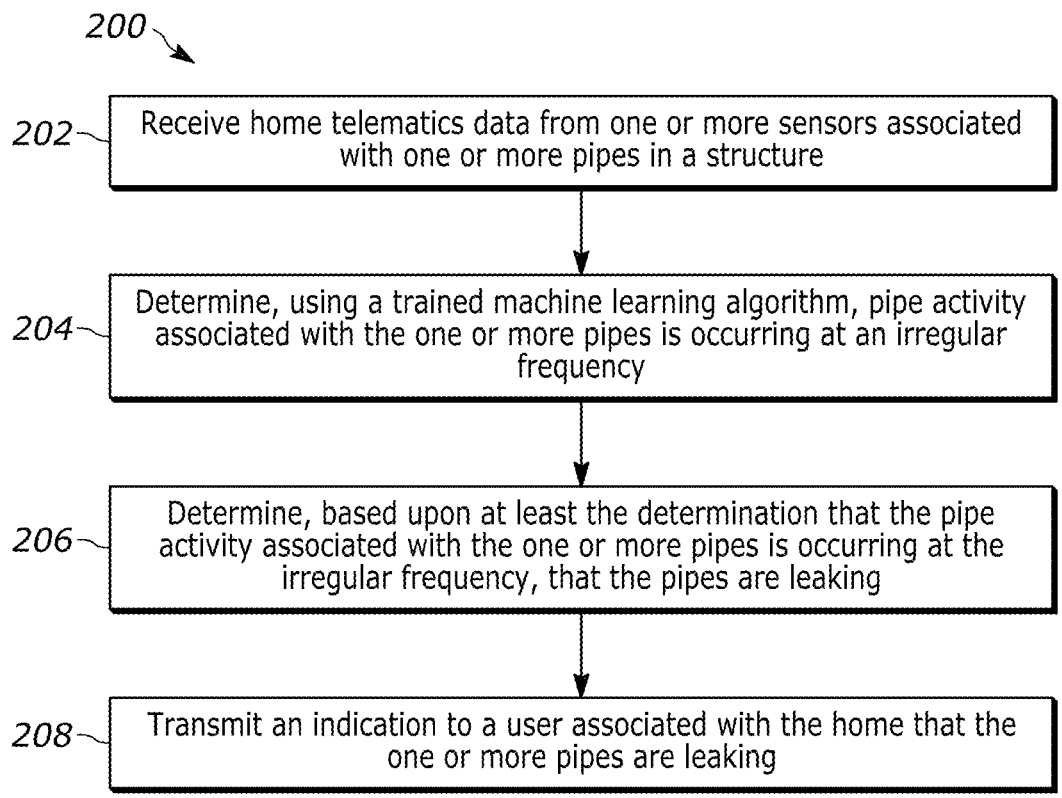
FIG. 2 depicts a flow diagram representing an exemplary computer-implemented method for detecting a leak based upon home telematics data.

FIG. 2 is a flow diagram of an exemplary computer-implemented method 200 for detecting a leak based upon home telematics data. The method 200 may be implemented by one or more processors of a computing system, such as a computing device representing property 116 or mobile device 112. Alternatively or additionally, the method 200 may be implemented by one or more processors of a distributed system, such as system 100 and/or various components of system 100 as described with regard to FIG. 1 above, or otherwise implemented by one or more local or remote processors, servers, sensors, transceivers, memory units, wearables, smart contacts, smart glasses, virtual reality headsets, augmented reality glasses or headsets, mixed or extended reality headsets or glasses, and/or other electronic or electrical components, including those mentioned elsewhere herein.

At block 202, the computer system 100 may receive home telematics data from one or more sensors associated with one or more pipes in a structure. Depending on the embodiment, the home telematics data may include and/or may be indicative of the frequency with which the one or more pipes are being used. For example, if the pipes are for an area of the building that is used infrequently (e.g., a guest bathroom or secondary bathroom), the home telematics data may be indicative of the frequency of use. In further embodiments, the home telematics data may further include data representative of a broader occupancy and/or frequency of use for a property in general.

In some embodiments, the sensors include one or more sensors applied under roofing, flooring, or other such tiling/paneling of a room in a building. For example, a sensor may be under a floor in a kitchen, bathroom, laundry room, etc. Similarly, a sensor may be directly under a roof in an attic, garage, crawlspace, etc. Additionally or alternatively, a sensor may be a mat for an underfloor upon which tiling is overlaid. Depending on the embodiment, the sensors may include visual sensors, infrared sensors (to detect a variance in temperature), capacitance/impedance sensor, vibration sensors, humidity sensors, an area sensor attached to a pipe jack, a water alarm, etc. In some embodiments, the sensors are embedded in tape and attached to or near a pipe. In some such embodiments, the tape wicks moisture across the tape to wires associated with the sensor and completes a circuit when wet, allowing the sensor to test a capacitance between the sensors.

At block 204, the system 100 may determine pipe activity associated with the one or more pipes is occurring at an irregular frequency. Depending on the embodiment, the system 100 may use a trained machine learning algorithm to determine whether the pipe activity is irregular. In some embodiments, each pipe, room, section of a building, etc. has a different algorithm (e.g., model) calibrated to determine a normal frequency, length of time to run, etc. for pipe activity.

In some embodiments, an application in the system 100 may have one or more initial basic models included that can be further calibrated. For example, the application may include a menu with options, such as kitchen, primary bathroom, secondary bathroom, pool, etc., that sets a base model for the system 100 to further calibrate/train as described below. In further embodiments, the model for each pipe (e.g., a hot water pipe, a cold water pipe, etc.) has a different model/algorithm.

In some embodiments, the system 100 trains the machine learning algorithm by using the home telematics data gathered at block 202. For example, the system 100 may use the gathered home telematics data as representative of regular activity for an area associated with the algorithm/model. Depending on the embodiment, the system 100 may update the machine learning algorithm every time the system detects water flow in the area associated with the algorithm/model (e.g., via the sensors described with regard to block 202 above). In further embodiments, the system 100 may train the machine learning algorithm for a predetermined period of time before using the algorithm for monitoring. For example, the system 100 may train the machine learning algorithm for 1 week, 1 month, 6 months, etc. and may subsequently use the machine learning algorithm to monitor for irregular activity. In further embodiments, the system 100 may additionally or alternatively prompt the user to confirm whether to use data for training. As such, the user may confirm whether irregular activity should be used to train the algorithm (e.g., where the irregular activity is indicative of an expected new trend). Depending on the embodiment, the system 100 may provide the confirmation prompt after each instance of detected activity, for detected activity occurring with a predetermined period of time of each other (e.g., providing a single prompt for use of the toilet, sink, and shower within the same hour for a bathroom), each day when activity is detected, etc. In some embodiments, the system 100 may provide the prompt only after the initial training period as described above.

Depending on the embodiment, the system 100 may detect water flow by comparing and/or matching patterns in vibration, audio, visual movement, etc. Similarly, depending on the embodiment, the system 100 may train the machine learning model/algorithm to filter out potential noise through audio, visual, or vibration means by using different water flow vibrations, sounds, or visuals to train the machine learning model/algorithm. As such, depending on the embodiment, the system 100 may filter out vibrations, audio cues, visual cues, etc. unrelated to water flow, such as footsteps.

Similarly, depending on the embodiment, the system 100 may use visual cues, such as an overflowing sink, bathtub, toilet, water dripping down walls, etc., to determine that irregular pipe activity is occurring. In some such embodiments, the system 100 may use image analysis, audio analysis, infrared sensor analysis, etc. techniques to determine whether irregular pipe activity is occurring. In some embodiments, such techniques may include edge detection and comparison to water level, water flow detection (e.g., over an edge), water detection (e.g., filling a bathtub), etc. Depending on the embodiment, the system 100 may use machine learning techniques as discussed herein to train the models/algorithms. In some such embodiments, the system 100 may use the detection of water flow as an indication to provide telematics data to the machine learning algorithm for training as described herein.

In further embodiments, the system 100 may determine whether the activity occurs at an irregular frequency based at least partially upon an occupancy of the property. For example, the system 100 may determine that the activity is occurring at an irregular frequency because the system 100 determines that the property is currently unoccupied. Depending on the embodiment, the system 100 may train multiple machine learning algorithms based on the occupancy status for the property (e.g., a first algorithm when the property is occupied and a second algorithm when the property is unoccupied). As such, the system 100 may determine whether activity occurs at an irregular frequency depending upon whether the property is occupied.

At block 206, the system 100 may determine that the pipes are leaking based upon the irregular frequency of pipe activity. Depending on the embodiment, the system 100 may determine that the change in frequency is representative of one or more leaks, bursting, and/or other such damage to the pipes. For example, the system 100 may determine that a pipe is experiencing lower activity than usual, and may subsequently determine that a pipe somewhere earlier in the process has sprung a leak, been blocked, burst, or otherwise been damaged so as to prevent water flow from reaching the pipe in question. Similarly, excessive water flow may cause the system 100 to determine that the pipe in question is receiving water from a pipe that should not be providing water (e.g., the earlier pipe is leaking, burst, blocked, etc.).

At block 208, the system 100 may generate and transmit an indication to a user associated with the building that the one or more pipes are leaking. Depending on the embodiment, the system includes an application coupled to the one or more sensors. In some such embodiments, the application sends an alert to a user when the sensor detects leakage and/or the system determines that leaking is occurring. In some such embodiments, the application identifies a sensor and a location in which the sensor is placed in the indication to the user. Depending on the embodiment, the indication to the user includes at least one of: (i) an alert through a mobile application; (ii) a text message; or (iii) an audio alert through a user device. In further embodiments, the system 100 may additionally or alternatively transmit an indication by causing a smart device associated with the property to stop water flow to the area of the detected leak. Similarly, the system 100 may transmit instructions or options for the user to address the leak.

Depending on the embodiment, the system 100 may determine what indication to provide to the user based on the occupancy of the property, as described herein. For example, the system 100 may determine to transmit the alert to the user if the property is determined to be unoccupied, and may instead transmit the instructions or options for the user to address the leak if the property is occupied.

Figure 3:
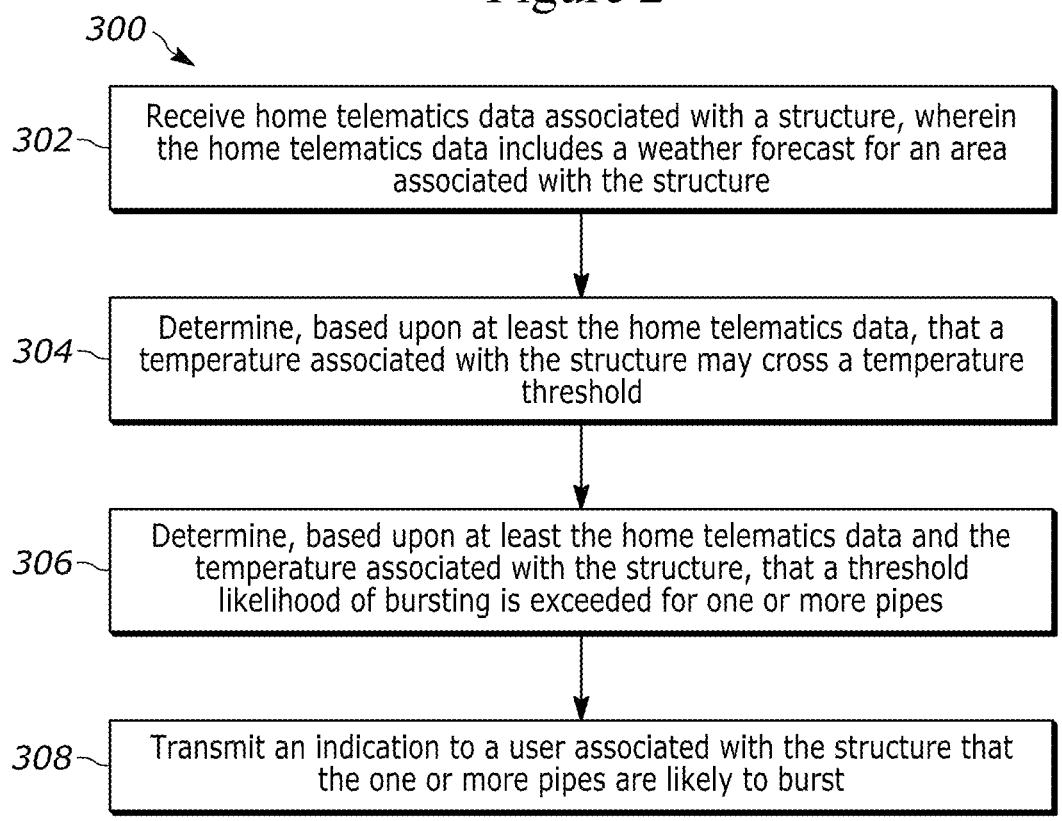
FIG. 3 depicts a flow diagram representing an exemplary computer-implemented method for detecting a potential damaged pipe based upon home telematics data.

FIG. 3 is a flow diagram of an exemplary computer-implemented method 300 for detecting a leak based upon home telematics data. The method 300 may be implemented by one or more processors of a computing system, such as a computing device representing property 116 or mobile device 112. Alternatively or additionally, the method 300 may be implemented by one or more processors of a distributed system, such as system 100 and/or various components of system 100, as described with regard to FIG. 1 above, or otherwise implemented by one or more local or remote processors, servers, sensors, transceivers, memory units, mobile devices, wearables, virtual reality headsets, and/or other electronic or electrical components, including those discussed elsewhere herein.

At block 302, the system 100 may receive home telematics data associated with a structure. In some embodiments, the home telematics data includes a weather forecast for an area associated with the structure. Depending on the embodiment, the weather forecast may be a local weather forecast and/or national weather forecast (e.g., from a weather service), a local temperature, a local moisture/humidity detection, a local snowfall detection, etc. In further embodiments, the system 100 may include one or more sensors, such as water flow sensors, and/or smart devices, such as a smart HVAC unit, and determines a weather forecast based upon the received information. In some embodiments, the system 100 determines whether a storm is approaching based upon the home telematics data.

In some embodiments, the home telematics data may be indicative of moisture and/or water flow in the building. In further embodiments, the home telematics data may be indicative of an occupancy and/or usage of the building. For example, the home telematics data may include motion sensor data, electricity usage data, smart device data, water flow data, etc. In such embodiments, the system 100 may determine whether an individual is occupying the building based upon the home telematics data. Depending on the embodiment, the system 100 may make the determination using a trained machine learning model as discussed herein.

Similar to the description of FIG. 2 above, at block 302 the system 100 may retrieve home telematics data indicative of an occupancy status for a property and determine whether the property is occupied. In further embodiments, the system 100 determines the occupancy status of a property based upon factors, such as power use, data received from smart devices on the property, historical occupancy data, etc. The system 100 may make determinations based upon the occupancy status of the property, as described in more detail below.

At block 304, the system 100 may determine, based upon at least the home telematics data, that a temperature associated with the structure will reach a temperature threshold. Depending on the embodiment, the temperature threshold may be an absolute temperature threshold, such as a freezing temperature (e.g., below 32 degrees Fahrenheit or 0 degrees Celsius). In further embodiments, the temperature threshold may be a relative temperature threshold (e.g., if the temperature changes by more than 10 degrees within a predetermined time period) as indicative of a weather pressure front or storm front approaching.

Depending on the embodiment, the system 100 may modify the temperature threshold based on occupancy data. For example, the system 100 may determine that a user is present in the home and will likely turn the heat up when the temperature reaches a particular point, and sets the temperature threshold accordingly. Similarly, the system 100 may determine whether a property has been winterized based on the occupancy determination and/or other telematics data (e.g., sensor data, smart device data, user indications, etc.) and may modify the temperature threshold accordingly.

At block 306, the system 100 may determine, based upon at least the home telematics data and the temperature associated with the structure, that a threshold likelihood of bursting is exceeded for one or more pipes. In some embodiments, the system 100 may make such a determination based upon a likelihood that one or more pipes in the building are freezing and/or likely contain water that will freeze. Depending on the embodiment, the system 100 may make the determination automatically upon determining that the temperature threshold is reached. In further embodiments, the system 100 may take into account additional factors in determining that a threshold likelihood of bursting is exceeded. For example, the system 100 may include factors, such as (i) a location of each of the one or more pipes, (ii) a size of the structure, (iii) a likely drop in temperature for the area associated with the structure, (iv) a location of the one or more smart devices, (v) material of pipes (e.g., cast iron, plastic, etc.), and/or any other such factors.

In some embodiments, the system 100 may further base the determination upon a determination as to whether the property is occupied, as described in more detail above. For example, the system 100 may determine that, because the property is occupied, an occupant will likely increase the temperature or take action and may therefore determine that the pipes and/or water in the pipes are not likely to freeze.

At block 308, the system 100 may transmit an indication to a user associated with the structure that the one or more pipes are likely to burst. Depending on the embodiment, the indication may include one or more recommendations for actions the user can take to mitigate and/or prevent damage. For example, the indication may include a recommendation to turn off a water valve, raise temperature, open cabinets with piping to expose the piping to warmer temperatures, etc.

In some embodiments in which the system 100 includes one or more smart devices, the system 100 may cause the smart device(s) to activate. As such, the system 100 can remotely cause a water valve to shut, the temperature to increase, a heater to activate, a drainage system to activate, etc. In such embodiments, the system 100 may include a description of any actions taken in the indication to the user.

In further embodiments, the system 100 may determine by how much to raise a temperature of the building. As such, the system 100 may use factors as described above, such as building location, pipe location, thermostat location, etc. For example, the system 100 may determine that, because the pipes are in outside walls, the system 100 may need to increase the temperature proportionally even if the middle of the house is above the threshold. In such embodiments, the system 100 may use an average temperature throughout the building. In further embodiments, the system 100 may have a cap value that the system will not raise the temperature above (e.g., 40 degrees Fahrenheit, 50 degrees Fahrenheit, 60 degrees Fahrenheit, etc.). In further embodiments, the system 100 may automatically take the temperature to the cap. In still further embodiments, the system 100 may determine a period of time for which the temperature should be increased and lowers the temperature back to the previous state once the period of time has passed.

In some embodiments, the system 100 further determines a course of action to take at block 308 based on the occupancy. For example, the system 100 may determine to send an alert to an occupant and/or homeowner if the property is occupied, and may instead determine to automatically activate the heating system as described above if the property is determined to be unoccupied. Similarly, the system 100 may determine to send an alert to an occupant if the property is occupied and later automatically activate the heating system if the occupant does not respond or otherwise indicate receipt of the alert.

Depending on the embodiment, the system 100 may determine that a user has opted in to allow such notifications and/or modifications (e.g., based upon a picture to verify installation, a purchase regarding such, etc.), and may subsequently offer a discount to a premium on the building, plumbing, items in the building, etc. based upon the installation and/or opt-in.

Remote Home Monitoring & Mitigating/Preventive Actions

Figure 4:
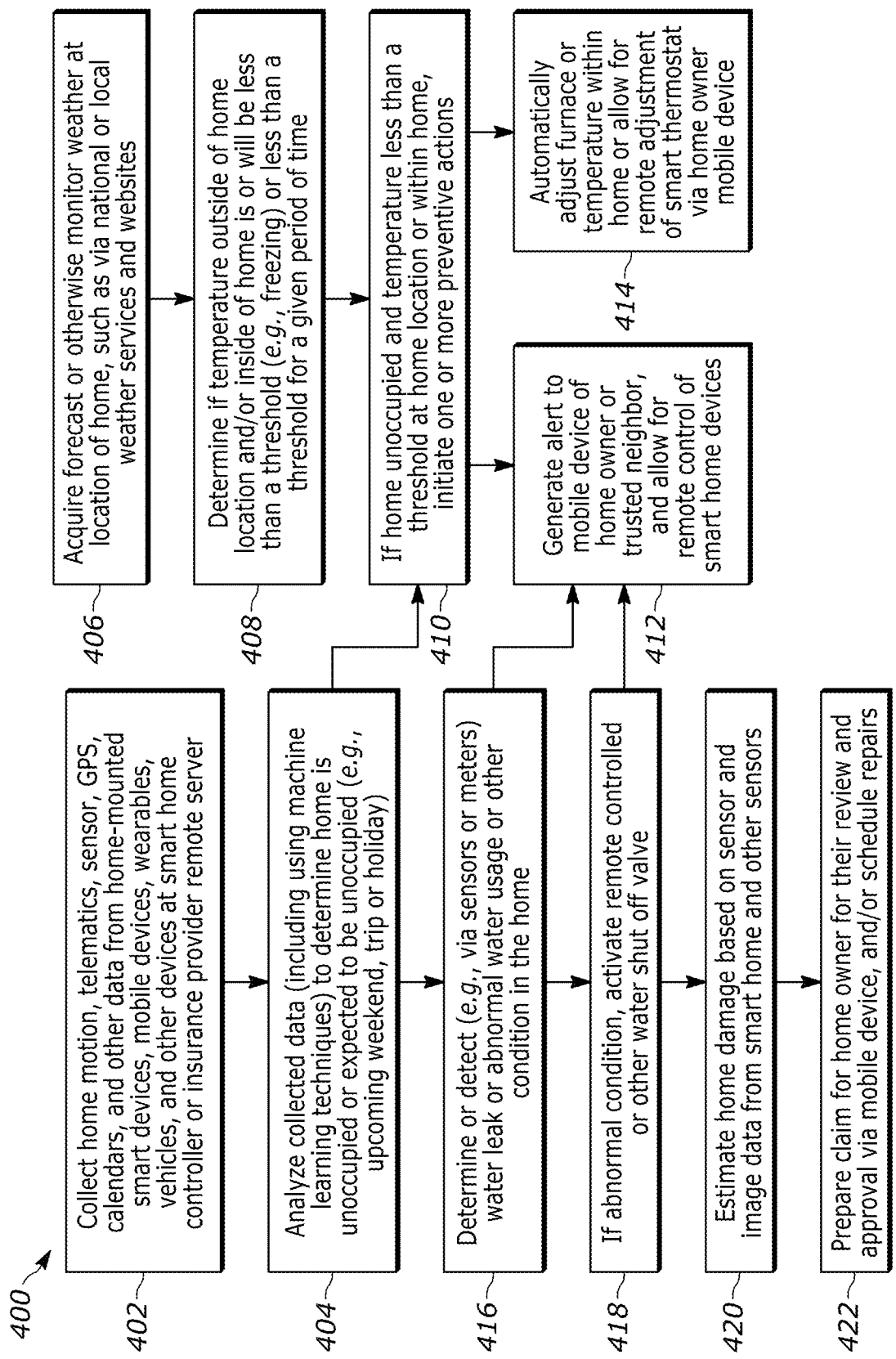
FIG. 4 depicts a flow diagram representing an exemplary computer-implemented method for mitigating or preventing water damage to a home or other building.

FIG. 4 illustrates a computer-implemented method 400 of remote home monitoring and instituting mitigating or preventive correction actions according to a combination of techniques as described herein, particularly with regard to FIGS. 2 and 3 above. The method may be implemented via one or more local or remote processors, transceivers, servers, sensors (including cameras), mobile devices, smart vehicles, wearables, smart glasses, smart contacts, smart watches, augmented reality glasses, virtual reality headsets, mixed or extended reality glasses or headsets, and/or other electronic or electrical components. For example, in some embodiments, a smart home may be configured with a smart home controller in wired or wireless communication with one or more home-mounted sensors (including cameras, security devices, door and window sensors, water sensors, electricity usage sensors or meters, water usage sensors or meters, etc.), mobile devices (including wearables and other devices mentioned herein), and/or smart vehicles.

At block 402, the computer-implemented method 400 may include collecting, generating, or otherwise receiving, via one or more processors, sensors, and/or transceivers, home motion, home telematics (e.g., electricity or water usage data), home sensor, mobile device or vehicle GPS data, resident electronic calendar data, and other data, including data generated or received by home-mounted smart device, mobile devices, wearables, smart glasses or headsets, smart watches, vehicles, and other electronic devices. In one embodiment, the home, sensor, and other data generated may be collected or received, such as via wireless communication over one or more radio frequency links, at a smart home controller or a remote server, such as an insurance provider remote server. In some embodiments, block 402 is similar to block 202 as described above with regard to FIG. 2, and various embodiments described with regard to block 202 similarly apply to block 402.

At block 404, the computer-implemented method 400 may include analyzing, via the one or more processors or servers, the data collected to determine that the home is unoccupied or expected to be unoccupied (such as with normal travel associated with work weeks, weekends, trips, or holidays). In some embodiments, machine learning techniques may be used to predict periods during which the home is not occupied, such as by analyzing patterns for home occupants (e.g., past travel patterns, work patterns, or the like).

At block 406, the computer-implemented method 400 may include acquiring or monitoring, via the one or more processors, servers, and/or transceivers, forecasts or weather data for the location of the home. For instance, one or more processors or servers may monitor one or more national or local weather services and/or websites. In some embodiments, block 406 is similar to block 302 as described above with regard to FIG. 3, and various embodiments described with regard to block 302 similarly apply to block 406.

At block 408, the computer-implemented method 400 may include determining if the temperature outside of the home location and/or inside of the home is, or will be, less than a threshold temperature (e.g., freezing) or less that a threshold temperature for a given period of time. For instance, the method may include determining that the temperature inside of the home is expected to be less than 32 degrees for a prolonged period time given the outside temperature and the size of the home. In some embodiments, block 408 is similar to block 304 as described above with regard to FIG. 3, and various embodiments described with regard to block 304 similarly apply to block 408.

It will be understood that blocks 406 and 408 may occur before, during, or after blocks 402 and/or 404. Similarly, depending on the embodiment, the flow may proceed from block 404 to block 410 and/or block 416 in parallel with, before, or after the flow proceeding from block 408 to 410.

At block 410, the computer-implemented method 400 may include, if the home is unoccupied (or will be, or is predicted to be, unoccupied) and the temperature (such as outside temperature at the home location or temperature within the home) is, or will be, less than the threshold temperature initiating one or more preventive actions. The preventive actions may include automatically operating smart home devices (e.g., smart valves, smart furnaces, smart heaters); allowing for the home owner to command the operation of smart home devices, such as by using a remote controller via their mobile device; and/or generating alerts, such as mobile device alerts.

Depending on the embodiment, the computer-implemented method 400 may cause one or more processors, servers, and/or transceivers to perform one or more functionalities based upon the determinations made and/or data gathered at blocks 402, 404, 406, 408, 410, and/or 416. For example, at block 412, the computer-implemented method 400 may include generating and transmitting, via one or more processors, servers, and/or transceivers, an electronic or virtual alert to the mobile device of the home owner or a trusted neighbor, and/or allow for remote control of smart home devices (including smart furnaces or thermostats). As another example, the computer-implemented method 400 may include automatically adjusting, via one or more processors, servers, and/or transceivers, a smart furnace or the temperature within the home or allow for the home owner to remotely adjust a smart thermostat via the home owner's mobile device as shown in block 414. In some embodiments, blocks 412 and/or 414 are similar to block 208 as described above with regard to FIG. 2 and block 308 as described above with regard to FIG. 3, and various embodiments described with regard to blocks 208 and 308 similarly apply to block 412 and/or 414.

At block 416, if the home is determined to be unoccupied (or, depending on the embodiment, even if the home is occupied), the computer-implemented method 400 may include determining or detecting, via one or more processors, sensors, meters, servers, and/or transceivers, an abnormal condition exists, such as a water leak or abnormal water usage in or about the home. In some embodiments, block 416 is similar to blocks 204 and/or 206 as described above with regard to FIG. 2, and various embodiments described with regard to blocks 204 and/or 206 similarly apply to block 416.

At block 418, if an abnormal water or water-usage condition exists, the computer-implemented method 400 may include automatically activating or operating a remote controlled or other water shut-off valve.

It will be understood that the flow may proceed from block 416 to block 418 and/or 412 before, during, or after the flow proceeds from block 412 and/or 414. Similarly, the flow may proceed from block 418 to blocks 412 and/or 420 in parallel with the flow proceeding from block 410 to blocks 412 and/or 414 and from block 416 to block 412.

At block 420, the computer-implemented method 400 may include determining, via the one or more processors or servers, that the home has received water damage and/or other damage caused by the water leakage or water event. For instance, the one or more processors or servers may receive images from one or more home-mounted sensors or cameras (and other sensors, including those mentioned herein), and input the images received into a machine learning algorithm trained to identify water or other home damage, and/or trained to estimate home damage based upon the sensor and image date received from the smart home and other sensors.

At block 422, the computer-implemented method 400 may include, via the one or more processors or servers, preparing, generating, and/or transmitting a virtual insurance claim for the home owner for their review, modification, and/or approval via their mobile device. The computer-implemented method 400 may also include, via the one or more processors, servers, and/or transceivers, scheduling a contractor to repair the damage for the home owner. The method may include additional, less, or alternate actions, including those discussed elsewhere herein.

It will be understood that the above disclosure is one example and does not necessarily describe every possible embodiment. As such, it will be further understood that alternate embodiments may include fewer, alternate, and/or additional steps or elements.

Exemplary Leak Detection Applications and Interfaces

Figure 5:
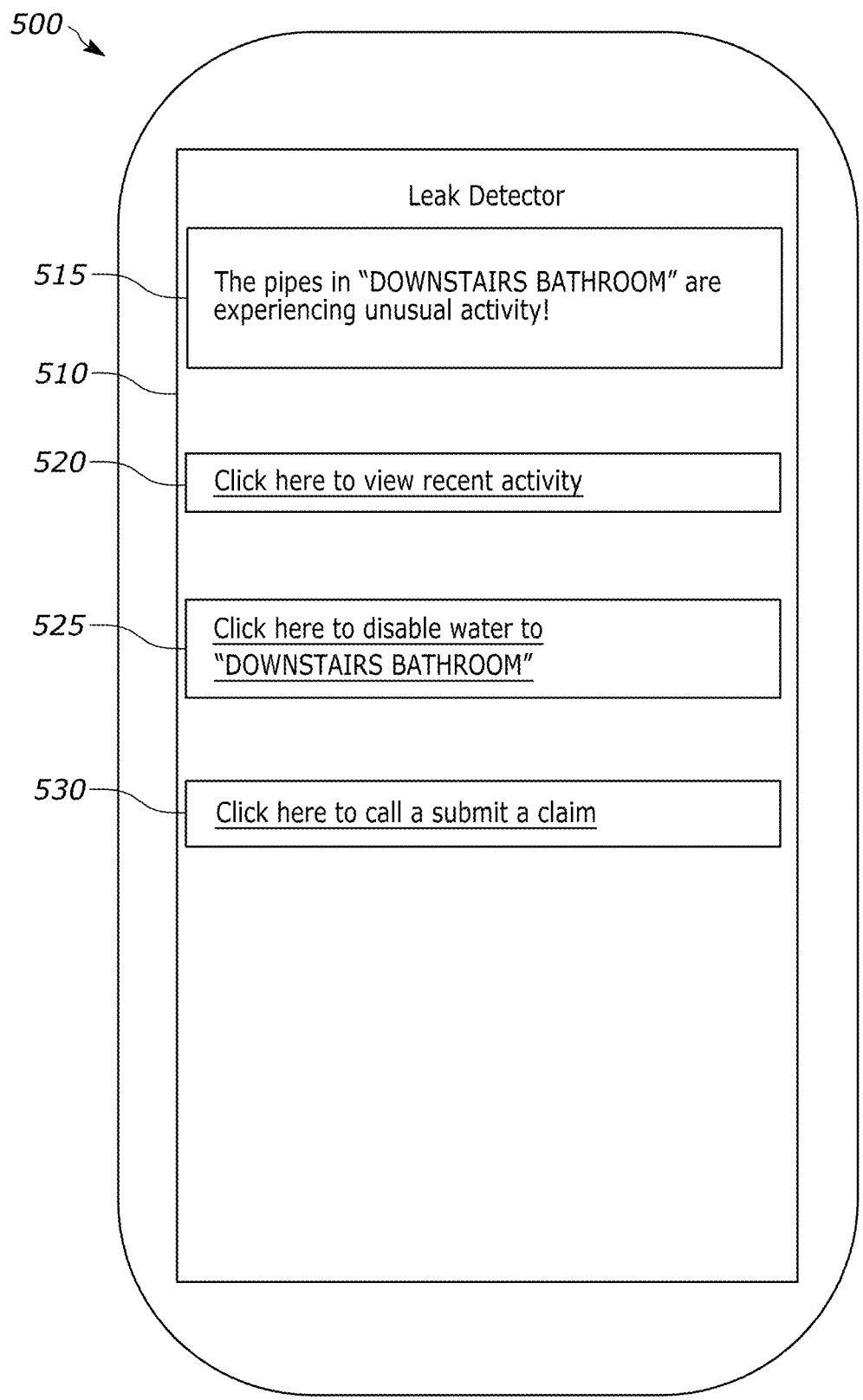
FIG. 5 depicts an exemplary interface for depicting a leak event and potential options to take to a user.

FIG. 5 illustrates an interface 500 that displays a page 510 of an application (e.g., command application 172) or a website providing information regarding a detected and/or determined leak to a user. The page 510 may include an indication of a leak location 515 and one or more options for courses of action that a user can take to address the leak. Although FIG. 5 depicts three options, it will be understood that a page 510 may provide any suitable number of options, including a link to a page that includes more or all of the options.

In some embodiments, the leak location 515 may be or include a name for the leak location according to the user. For example, in the exemplary embodiment of FIG. 5, the leak location 515 is named "DOWNSTAIRS BATHROOM" by the user. In some embodiments, the user may name the leak location 515 upon associating the sensors in question with the application in question. In further embodiments, the leak location 515 may be a sensor number or other such name automatically assigned by the application (e.g., "SENSOR 2" or "LOCATION 4").

In further embodiments, the page 510 depicts various options for a user to take in responding to the leak. In some such embodiments, the page 510 may include an indication of recent activity 520. The indication of recent activity 520 may be a link to the most recent activity from the pipes. The interface 500 may display the activity in the form of a list or table (e.g., entries indicating the time and location or appliance), a graph/model (e.g., depicting the change in activity over time), etc. Depending on the embodiment, the indication of recent activity 520 and/or the page 510 displaying the indication of recent activity 520 includes a link, button, prompt, and/or other such interaction-based component to accept the recent activity, dismiss the recent activity, etc. In some embodiments, the user may indicate via the interface 500 that the application and/or system should use or discard the data as training data for the model determining whether irregular activity occurs (e.g., notes that this behavior is expected and/or normal or discarding it as an irregularity).

Depending on the embodiment, the page 510 may include one or more action commands (e.g., action command 525 and/or 530) a user may interact with to cause the application and/or a system associated with the application to take the appropriate action. In some embodiments, the page 510 may include an action command 525 to cause a system associated with the application to take action to rectify the detected leak. For example, if the application is coupled to a smart device that regulates and/or controls water flow on a property, the user may activate the smart device via the action command 525 in the interface 500. In further embodiments, the action command 525 may additionally or alternatively cause a call to be placed to a specialist to address the problem, include a link to a "do-it-yourself" (DIY) solution, etc. Depending on the embodiment, a system and/or entity associated with the application may provide a user a discount to a premium, policy, etc. for enabling an action command 525. Similarly, in further embodiments, the page 510 may include an action command 530 to allow a user to submit a claim and/or otherwise report the leak.

By providing action commands 525 and/or 530 to a user, a system may provide technical advantages. For example, such a system may allow for remote control of various components to reduce the damage caused by leaks in pipes. Similarly, such a system may allow for increased operation efficiency by identification of points that should be shut down while leaving functioning portions of the overall system untouched. A system that automatically determines portions of the plumbing should be shut down may provide other benefits, such as further reduction of damage while still retaining similar benefits by allowing a user to manually and/or remotely adjust the overall operation.

Depending on the embodiment, the interface 500 may include a link to additional and/or alternative action commands that a user may use to take other actions and/or to additional resources the user may use to come to an informed decision regarding the leak. Similarly, it will be understood that the interface may include additional action commands that allow a user more particular and/or wider control over various aspects of the leak detection system, such as inputting training data for a model, running simulations, viewing past and/or present information related to a particular sensor system, etc.

It will further be understood that the above disclosure is one example and does not necessarily describe every possible embodiment. As such, it will be further understood that alternate embodiments may include fewer, alternate, and/or additional steps or elements.

Figure 6:
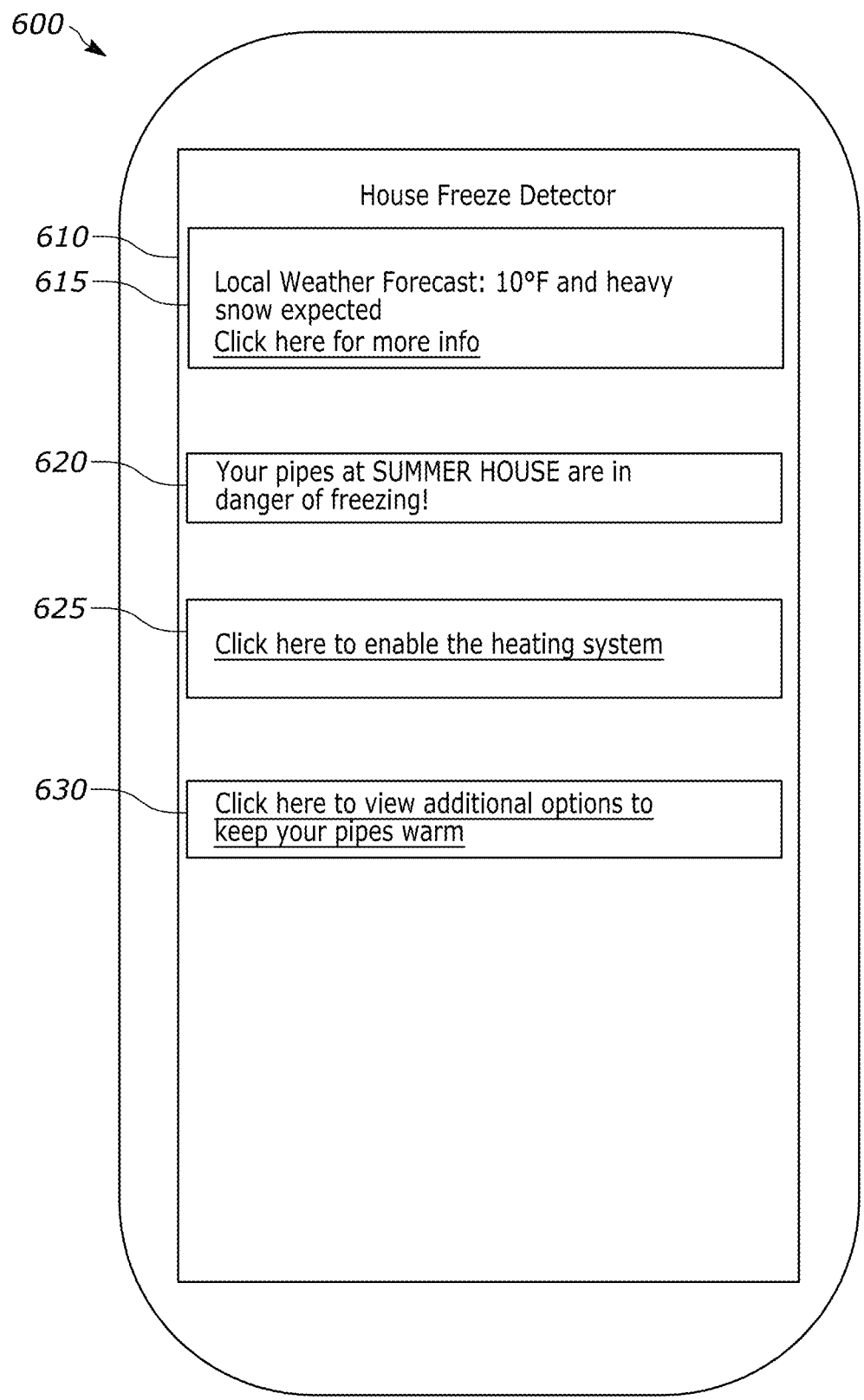
FIG. 6 depicts an exemplary interface for depicting a frozen pipe event and potential options to take to a user.

FIG. 6 illustrates an interface 600 that displays a page 610 of an application or a website providing information for detecting potential freezing in a pipe system of a property. In particular, the page 610 may include an indication of a weather forecast 615 and one or more options for courses of action that a user can take to address the frozen pipes. Although FIG. 6 depicts two options, it will be understood that a page 610 may provide any suitable number of options, including a link to a page that includes more or all of the options.

In some embodiments, the weather forecast 615 may include a current temperature, current climate condition, expected conditions, etc. Depending on the embodiment, the weather forecast 615 may depict the weather forecast 1 hour ahead of time, 12 hours ahead of time, 1 day ahead of time, etc. In some embodiments, the weather forecast 615 may include a link, dropdown menu, etc. to display additional information regarding the weather data. In further embodiments, such a link may redirect the user to a third party website from which the application draws weather data. Alternatively, the link may redirect the user to a page associated with the application or interface 600 maintained by an entity responsible for the application.

In some embodiments, the page 610 includes a location name 620 associated with the detected leak and/or freeze event. Depending on the embodiment, the location name 620 may be or include a name for the leak location as defined by a user associated with the interface 600 and/or the application. For example, in the exemplary embodiment of FIG. 6, the leak location 620 is named "SUMMER HOUSE" by the user. In some embodiments, the user may name the leak location 620 upon associating the sensors in question with the application in question. In further embodiments, the leak location 620 may be a sensor number or other such name automatically assigned by the application (e.g., "SENSOR 3" or "LOCATION 4"). In still further embodiments, the leak location 620 may be a location of a property, of a room in a property, of a particular sensor in a property, etc.

Depending on the embodiment, the page 610 may include one or more action commands (e.g., action command 625 and/or 630) a user may interact with to cause the application and/or a system associated with the application to take the appropriate action, similar to action commands 525 and/or 530 as described above with regard to FIG. 5. In some embodiments, the page 610 may include an action command 625 to cause a system associated with the application to take action to rectify the detected leak or potential for frozen pipes. For example, if the application is coupled to a smart device that regulates and/or controls heat on a property, the user may activate the smart device via the action command 625 in the interface 600. In further embodiments, the action command 625 may additionally or alternatively cause a call to be placed to a specialist to address the problem, include a link to a "do-it-yourself" (DIY) solution, shut off water to a location, cause one or more other smart devices to operate (e.g., opening cabinet doors, vents, etc.), submit a claim to an entity associated with the application, and/or any other similar action. Depending on the embodiment, a system and/or entity associated with the application may provide a user a discount to a premium, policy, etc. for enabling an action command 625.

By providing action commands 625 and/or 630 to a user, a system may provide technical advantages similar to those discussed above with regard to FIG. 5. For example, such a system may allow for remote control of various components to reduce the damage caused by frozen or potentially frozen pipes. Similarly, such a system may allow for increased operation efficiency by identification of points that require additional heating while reducing waste by increasing heat only where necessary and by the necessary extent.

Depending on the embodiment, the interface 600 may include an action command 630 providing a link to additional and/or alternative action commands that a user may use to take other actions and/or to additional resources the user may use to come to an informed decision regarding the leak. Similarly, it will be understood that the interface may include additional action commands that allow a user more particular and/or wider control over various aspects of the leak detection system, such as inputting training data for a model, running simulations, viewing past and/or present information related to a particular sensor system, etc.

It will be understood that the above disclosure is one example and does not necessarily describe every possible embodiment. As such, it will be further understood that alternate embodiments may include fewer, alternate, and/or additional steps or elements.

With the foregoing, a user may opt-in to a rewards, insurance discount, or other type of program. After the user provides their affirmative consent, an insurance provider remote server may collect data from the user's mobile device, smart home device, smart vehicle, wearables, smart glasses, smart contacts, smart watch, augmented reality glasses, virtual reality headset, mixed or extended reality headset or glasses, and/or other smart devices—such as with the customer's permission or affirmative consent. The data collected may be related to smart home functionality, accident data, and/or insured assets before (and/or after) an insurance-related event, including those events discussed elsewhere herein. In return, risk averse insureds, home owners, or home or apartment occupants may receive discounts or insurance cost savings related to home, renters, auto, personal articles, and other types of insurance from the insurance provider.

In one aspect, smart or interconnected home data, user data, and/or other data, including the types of data discussed elsewhere herein, may be collected or received by an insurance provider remote server, such as via direct or indirect wireless communication or data transmission from a smart home device, mobile device, smart vehicle, wearable, smart glasses, smart contacts, smart watch, augmented reality glasses, virtual reality headset, mixed or extended reality glasses or headset, and/or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, vehicles, or renter belongings, and/or (ii) home or apartment renters and/or occupants.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method, for determining a likelihood of bursting for one or more pipes, the method comprising:
   receiving, by one or more processors, home telematics data associated with a structure, wherein the home telematics data includes a weather forecast for an area associated with the structure;
   determining, by the one or more processors and based upon at least the home telematics data, that a temperature associated with the structure will reach a temperature threshold;
   determining, by the one or more processors and based upon at least the home telematics data and the temperature associated with the structure, that a threshold likelihood of bursting is exceeded for one or more pipes;
   transmitting, by the one or more processors, an indication to a user associated with the structure that the one or more pipes are likely to burst; and
   calculating, by the one or more processors, a temperature modification value by which to increase the temperature associated with the structure based upon at least a location of each of the one or more pipes, wherein the temperature modification value is indicative of a proportional increase when the one or more pipes are located in external walls.

2. The computer-implemented method of claim 1, further comprising:
   causing one or more smart devices in the structure to increase the temperature associated with the structure.

3. The computer-implemented method of claim 1, further comprising:
   causing a water flow through the one or more pipes to stop responsive to the determining that the threshold likelihood of bursting is exceeded for the one or more pipes.

4. The computer-implemented method of claim 1, further comprising:

determining that pipe activity associated with the one or more pipes is occurring at an irregular frequency;

wherein the determining that the threshold likelihood of bursting is exceeded for the one or more pipes is further based upon the pipe activity.

5. The computer-implemented method of claim 1, further comprising:

detecting, based upon the home telematics data, that the user is not present at the structure;

wherein the determining that the temperature associated with the structure will reach the temperature threshold is responsive to the detecting.

6. The computer-implemented method of claim 1, wherein the indication that the one or more pipes are likely to burst includes one or more recommended actions for the user to mitigate damage.

7. A computing device determining a likelihood of bursting for one or more pipes, the computing device comprising:

one or more processors;

a communication unit; and a non-transitory computer-readable medium coupled to the one or more processors and the communication unit and storing instructions thereon that, when executed by the one or more processors, cause the computing device to:

receive home telematics data associated with a structure, wherein the home telematics data includes a weather forecast for an area associated with the structure;

determine, based upon at least the home telematics data, that a temperature associated with the structure will reach a temperature threshold;

determine, based upon at least the home telematics data and the temperature associated with the structure, that a threshold likelihood of bursting is exceeded for one or more pipes;

transmit an indication to a user associated with the structure that the one or more pipes are likely to burst; and calculate a temperature modification value by which to increase the temperature associated with the structure based upon at least a location of each of the one or more pipes, wherein the temperature modification value is indicative of a proportional increase when the one or more pipes are located in external walls.

8. The computing device of claim 7, wherein the non-transitory computer-readable medium further include instructions that, when executed by the one or more processors, cause the computing device to:

cause one or more smart devices in the structure to increase the temperature associated with the structure.

9. The computing device of claim 7, wherein the non-transitory computer-readable medium further include instructions that, when executed by the one or more processors, cause the computing device to:

cause a water flow through the one or more pipes to stop responsive to the determining that the threshold likelihood of bursting is exceeded for the one or more pipes.

10. The computing device of claim 7, wherein the non-transitory computer-readable medium further include instructions that, when executed by the one or more processors, cause the computing device to:

determine that pipe activity associated with the one or more pipes is occurring at an irregular frequency;

wherein the determining that the threshold likelihood of bursting is exceeded for the one or more pipes is further based upon the pipe activity.

11. The computing device of claim 7, wherein the non-transitory computer-readable medium further include instructions that, when executed by the one or more processors, cause the computing device to:

detect, based upon the home telematics data, that the user is not present at the structure;

wherein the determining that the temperature associated with the structure will reach the temperature threshold is responsive to the detecting.

12. The computing device of claim 7, wherein the indication that the one or more pipes are likely to burst includes one or more recommended actions for the user to mitigate damage.

13. A tangible, non-transitory computer-readable medium storing instructions for determining a likelihood of bursting for one or more pipes that, when executed by one or more processors of a computing device, cause the computing device to:

receive home telematics data associated with a structure, wherein the home telematics data includes a weather forecast for an area associated with the structure;

determine, based upon at least the home telematics data, that a temperature associated with the structure will reach a temperature threshold;

determine, based upon at least the home telematics data and the temperature associated with the structure, that a threshold likelihood of bursting is exceeded for one or more pipes;

transmit an indication to a user associated with the structure that the one or more pipes are likely to burst; and calculate a temperature modification value by which to increase the temperature associated with the structure based upon at least a location of each of the one or more pipes, wherein the temperature modification value is indicative of a proportional increase when the one or more pipes are located in external walls.

14. The tangible, non-transitory computer-readable medium of claim 13, wherein the non-transitory computer-readable medium further includes instructions that, when executed by the one or more processors, cause the computing device to:

cause one or more smart devices in the structure to increase the temperature associated with the structure.

15. The tangible, non-transitory computer-readable medium of claim 13, wherein the non-transitory computer-readable medium further includes instructions that, when executed by the one or more processors, cause the computing device to:

cause a water flow through the one or more pipes to stop responsive to the determining that the threshold likelihood of bursting is exceeded for the one or more pipes.

16. The tangible, non-transitory computer-readable medium of claim 13, wherein the non-transitory computer-readable medium further includes instructions that, when executed by the one or more processors, cause the computing device to:

determine that pipe activity associated with the one or more pipes is occurring at an irregular frequency;

wherein the determining that the threshold likelihood of bursting is exceeded for the one or more pipes is further based upon the pipe activity.

17. The tangible, non-transitory computer-readable medium of claim 13, wherein the non-transitory computer-readable medium further includes instructions that, when executed by the one or more processors, cause the computing device to:

detect, based upon the home telematics data, that the user is not present at the structure;

wherein the determining that the temperature associated with the structure will reach the temperature threshold is responsive to the detecting.

* * * * *